United States Patent
Pantus et al.

(10) Patent No.: US 11,776,368 B2
(45) Date of Patent: Oct. 3, 2023

(54) SELECTIVE INTRUSION DETECTION SYSTEMS

(71) Applicant: CARRIER Fire & Security Americas Corporation, Inc., Palm Beach Gardens, FL (US)

(72) Inventors: Mathias Pantus, Brunssum (NL); Jeroen Te Paske, Roggel (NL); Pascal Van De Mortel, Mierlo (NL); Leon Mintjens, Ittervoort (NL); Sorin Costiner, Somerville, MA (US); Michael J. Giering, Bolton, CT (US); Robert Labarre, Bradenton, FL (US); Mark Vogel, South Glastonbury, CT (US); Vijaya Ramaraju Lakamraju, Farmington, CT (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 123 days.

(21) Appl. No.: 17/240,456

(22) Filed: Apr. 26, 2021

(65) Prior Publication Data

US 2021/0319678 A1    Oct. 14, 2021

Related U.S. Application Data (63) Continuation of application No. 15/102,204, filed as application No. PCT/US2014/062906 on Oct. 29, 2014, now Pat. No. 11,080,974.

(Continued)

(51) Int. Cl.
*G08B 13/181* (2006.01)
*G01S 7/41* (2006.01)
(Continued)

(52) U.S. Cl.
CPC .......... *G08B 13/181* (2013.01); *G01S 7/415* (2013.01); *G01S 13/04* (2013.01); *G01S 13/56* (2013.01);
(Continued)

(58) Field of Classification Search
CPC ........ G01S 13/04; G01S 13/56; G01S 13/886; G01S 7/415; G08B 13/181; G08B 29/185; H04L 67/1095; H04L 67/1097
See application file for complete search history.

(56) References Cited

U.S. PATENT DOCUMENTS

| | | |
|---|---|---|
| 3,383,678 A | 5/1968 | Palmer |
| 3,967,283 A | 6/1976 | Clark et al. |

(Continued)

FOREIGN PATENT DOCUMENTS

| | | |
|---|---|---|
| CN | 100518638 C | 7/2009 |
| CN | 101641579 A | 2/2010 |

(Continued)

OTHER PUBLICATIONS

International Search Report and Written Opinion dated Jan. 1, 2015 for Internation Application No. PCT/US2014/062906.

*Primary Examiner* — Timothy A Brainard
(74) *Attorney, Agent, or Firm* — Locke Lord LLP; Joshua L. Jones; Gabrielle Gelozin (57) ABSTRACT

A selective intrusion detection system includes a Doppler transceiver configured and adapted to receive Doppler return signals indicative of moving targets present in a surveillance space. A processor is operatively connected to the Doppler transceiver to convert Doppler return signals into spectrograms and to determine whether any given spectrogram is indicative of presence of a human or another moving target, like a domestic pet. An alarm is operatively connected to the processor, wherein the processor and alarm are configured to (Continued)

provide an alert in the event the processor determines any given spectrogram is indicative of a human, and to forego providing an alert in the event the processor determines any given spectrogram is indicative of another moving target only.

23 Claims, 4 Drawing Sheets

Related U.S. Application Data (60) Provisional application No. 61/915,868, filed on Dec. 13, 2013.

(51) Int. Cl.
　　G01S 13/04　　(2006.01)
　　G01S 13/56　　(2006.01)
　　G01S 13/88　　(2006.01)
　　G08B 29/18　　(2006.01)
　　H04L 67/1095　(2022.01)
　　H04L 67/1097　(2022.01)

(52) U.S. Cl.
　　CPC ...... G01S 13/886 (2013.01); G08B 29/185 (2013.01); H04L 67/1095 (2013.01); H04L 67/1097 (2013.01)

(56) References Cited

U.S. PATENT DOCUMENTS

| | | | |
|---|---|---|---|
| 5,276,427 A | 1/1994 | Peterson | |
| 5,461,231 A | 10/1995 | Sugimoto et al. | |
| 5,473,311 A | 12/1995 | Hoseit | |
| 5,670,943 A | 9/1997 | DiPoala et al. | |
| 6,097,429 A | 8/2000 | Seeley et al. | |
| 6,137,407 A | 10/2000 | Akagawa et al. | |
| 6,211,522 B1 | 4/2001 | Kotlicki et al. | |
| 6,215,399 B1 | 4/2001 | Shpater | |
| 6,265,972 B1 | 7/2001 | Lee | |
| 6,559,448 B1 | 5/2003 | Muller et al. | |
| 7,075,431 B2 | 7/2006 | Buckley et al. | |
| 7,351,975 B2 | 4/2008 | Brady et al. | |
| 7,375,630 B2 | 5/2008 | Babich et al. | |
| 7,616,115 B2 | 11/2009 | Horak et al. | |
| 7,619,517 B2 | 11/2009 | Tracy | |
| 7,679,509 B2 | 3/2010 | Royer | |
| 7,705,730 B2 | 4/2010 | Royer | |
| 7,772,965 B2 | 8/2010 | Farhan et al. | |
| 7,787,663 B2 | 8/2010 | Hartlove | |
| 8,035,514 B2 | 10/2011 | Brown et al. | |
| 8,063,375 B2 | 11/2011 | Cobbinah et al. | |
| 8,102,261 B2 | 1/2012 | Wu | |
| 8,253,563 B2 | 8/2012 | Burnard et al. | |
| 8,410,923 B2 | 4/2013 | Wang et al. | |
| 8,525,724 B2 * | 9/2013 | Insanic ............... | G01S 13/951 342/26 D |
| 9,261,593 B1 * | 2/2016 | Mountcastle ....... | G01S 13/9088 |
| 2005/0196047 A1 * | 9/2005 | Owechko ............ | G06V 40/103 382/224 |
| 2006/0238411 A1 * | 10/2006 | Fullerton ............ | G01S 13/72 342/147 |
| 2007/0024494 A1 * | 2/2007 | Dizaji ................. | G01S 7/415 342/195 |
| 2009/0228204 A1 * | 9/2009 | Zavoli ................. | G01C 21/30 701/532 |
| 2013/0041856 A1 * | 2/2013 | Benitez ............... | G01S 13/867 342/28 |
| 2013/0093616 A1 * | 4/2013 | Jeon .................... | G01S 7/414 342/118 |
| 2014/0201126 A1 * | 7/2014 | Zadeh ................. | A61B 5/7221 706/52 |
| 2014/0317710 A1 * | 10/2014 | Sager .................. | H04W 12/06 726/7 |
| 2015/0186569 A1 * | 7/2015 | Sekine ................ | G06F 17/18 703/2 |

FOREIGN PATENT DOCUMENTS

| | | | | |
|---|---|---|---|---|
| CN | 102737463 A | 10/2012 | | |
| EP | 898771 A1 | 3/1999 | | |
| EP | 1264292 A1 | 12/2002 | | |
| EP | 1612750 A1 | 1/2006 | | |
| EP | 2116826 A1 | 11/2009 | | |
| EP | 2589979 A1 * | 5/2013 | ............ | F28F 9/00 |
| EP | 2589979 A1 | 5/2013 | | |
| FR | 2955950 A1 * | 8/2011 | ......... | G01S 13/526 |
| JP | 2005295469 A * | 10/2005 | | |
| WO | 2008063700 A2 | 5/2008 | | |
| WO | WO-2012119253 A1 * | 9/2012 | ............ | G01S 13/58 |

\* cited by examiner

SELECTIVE INTRUSION DETECTION SYSTEMS

RELATED APPLICATIONS

This application is a continuation of U.S. patent application Ser. No. 15/102,204, filed Jun. 6, 2016, which is a National Stage filing of PCT Application No. PCT/US2014/062906, filed Oct. 29, 2014, which claims the benefit of and priority to U.S. Provisional Patent Application No. 61/915,868 filed Dec. 13, 2013, the entire contents of which are incorporated herein by reference in their entirety.

FIELD OF THE INVENTION

The present invention is directed to the field of intrusion detection and alarm systems, and more particularly, to a novel selective intrusion detection system. The selectivity is aimed towards the capability of distinguishing humans from other moving targets that will be used in a variety of fields related to security systems.

BACKGROUND OF THE INVENTION

The concept of intrusion detection systems is well known in the art such as U.S. Pat. No. 6,239,736. However such systems do not contain any selectivity means as disclosed in U.S. Pat. No. 6,239,736. Therefore in many applications, such systems according to the prior art, will be prone to unwanted alarms from for example animals, geo-seismic activities, environmental disturbances (street traffic, water running through pipes, swaying trees, ceiling fans, oscillating fans, air conditioning systems, and the like), that may be moving in or near the surveillance space. For example, for indoor residential settings, pets are a major source of unwanted alarm triggers. In such applications, it is desired to have an alert provided upon the presence of a human intruder, and to forego an alert upon the presence of pets and other moving targets.

Prior attempts have been made to distinguish the human presence from the presence of other moving targets, but with limited success. Current technologies for monitoring, such as video cameras or microphone arrays, typically involve sensors with high spatial resolution. Such sensors are relatively complex and unreliable as they may require a human in the process loop to watch the signal in real time and manually enter the decision about the signal analyses of the operators observation, that is, whether the signal from such sensor originates from a human or from another moving target. Moreover, video surveillance will present privacy concerns, especially in residential and office surveillance systems.

There is a need in the art for intrusion detection systems with advanced selectivity in creating an alarm whilst detecting a human intruder, and foregoing an alarm whilst detecting other moving targets autonomously, without the need of a human decision. The present disclosure provides a solution for the functional selective intrusion detection system need and advances the state of the art by providing reliable, robust, and autonomous decision making.

SUMMARY OF THE INVENTION

An intrusion detection system is provided that includes, inter alia, a radar transceiver configured and adapted to receive radar signals indicative of moving targets present in a surveillance space. A processor is operatively connected to the radar transceiver to convert the radar signals into spectrograms and to determine whether any given spectrogram is indicative of presence of a human or another moving target in the surveillance space. An alarm indicator is operatively connected to the processor and is configured to provide an alert in the event the processor determines any given spectrogram is indicative of a human, and to forego providing an alert in the event the processor determines any given spectrogram is indicative only of other moving targets.

In certain embodiments, the processor is configured and adapted to determine whether any given spectrogram is indicative of a human based on a set of predetermined factors. The set of predetermined factors can include one or more of distribution of maximum Doppler power spectral density, frequency bin of the torso Doppler, frequency bin of the leg Doppler, frequency bins of the −6 dB torso Doppler points, the upper point, the lower point, average power generated by the legs, average of the frequencies with the power higher than a predetermined threshold, Q-factor, and higher order factors.

In another aspect, the processor can be configured and adapted to determine whether any given spectrogram is indicative of a human based on a predetermined algorithm that calculates an indicator for a human or for other moving targets. For example, if the indicator is defined on a scale from 0.0 to 1.0, with 0.0 being indicative of a other moving targets, and 1.0 being indicative of a human, the processor and alarm can be configured to provide an alert if the indicator has a value greater than about 0.5. In another aspect, the processor can be configured and adapted to convert radar signals into spectrograms using a set of modules including one or more of windowing, overlapping, short-time Fourier transform, clipping, binning, noise elimination, logarithmic conversion, amplitude correction, time grouping, whitening by means of horizontal and vertical bar-removal, vertical smoothing, and horizontal smoothing.

In certain embodiments, the intrusion detection system also includes a selectivity mode switch which alters the sensitivity of the processor in distinguishing between the presence of a human or another moving target. In certain embodiments, the intrusion system also includes range controlled radar technology operatively connected to the radar transceiver to adjust the surveillance space.

In certain embodiments, the intrusion detection system also includes a smart diagnostic system operatively connected to the processer to store spectrograms and corresponding user input for human/other moving target determinations to a database and to update determination processes of the processor based on the database. The smart detection system can use a plurality of basic features, such as Doppler strength, support vector machine (SVM) value, and human/other moving target identifiers to functionally save events for diagnostic purposes and continuously improve the performance using ground truth provided by a user or other sensor. In some embodiments, the intrusion detection system further includes communication means operatively connected to the processer to send spectrograms to an up-stream server to enable detailed selectivity processing further up-stream and to alleviate complexity and current consumption constraints down-stream.

A method of detecting intrusion is also provided, including the steps of converting a radar signal received from a surveillance space into a spectrogram. The method also includes analyzing the spectrogram to determine if any moving targets indicated in the spectrogram are human or other moving targets.

In certain embodiments, the step of analyzing the spectrogram includes extracting predetermined factors from the spectrogram and calculating an identifier for determining if any moving targets indicated in the spectrogram are human or other moving targets based on applying a predetermined algorithm to the predetermined factors. The method can further include the step of providing an alert for a given identifier value. The predetermined factors set can be indicative of variables in radar spectrograms of humans and other moving targets. The predetermined factors can also include variables that represent motion dynamics and biometric characteristics that distinguish humans and other moving targets. The predetermined factors can also be robust to noise. Test data has shown that accuracy of the system is maintained with an additional three decibels of Gaussian noise An embodiment of the selective intrusion detection system is provided that includes, inter alia, a Radar, Sonar or Lidar transceiver configured and adapted to receive Doppler return signals indicative of moving targets present in a surveillance space. A processor is operatively connected to the Doppler transceiver to convert the Doppler return signals into spectrograms and to determine whether any given spectrogram is indicative of presence of a human, or other moving targets moving throughout the surveillance space. The selectivity comprises means to create an alarm indication as a result of genuine intruder motion being present in the surveillance space and forego an alarm in cases of other moving targets (such as domestic pets; cats, dogs, birds, parrot), environmental disturbances (such as greenery, moving trees, weather, rodents, vermin, life stock), IBS (Intrinsic Building Signals, such as air conditioning units, fans, oscillating fans, ceiling fans, fluorescent lighting, geo-seismic activities, or water running through pipes), EMI (electromagnetic interferences, such as RFI radio frequency interference and ESD electrostatic discharges), as well as fluorescent light influence and the like.

In certain embodiments, the selective intrusion detection system also includes a selectivity mode switch for adapting the selectivity of the processor in order to match the security and financial risk as needed to the application at hand.

An embodiment of the intrusion alarm system for detecting the presence of a moving target in the presence of interfering phenomena includes a Doppler transceiver for transmitting signals into a surveillance zone; means for reception of Doppler signals returned from said surveillance zone; means for providing a spectrogram; and means for scene analysis of the spectrogram in order to determine respective origins of Doppler targets for providing reliable intrusion security and forgoing privacy issues. The Doppler transceiver can be a radar transceiver, a sonar transceiver, a Lidar transceiver, a range-gated-radar transceiver, or the like.

An embodiment of the intrusion alarm system for detecting the presence of a moving target in the presence of interfering phenomena includes a Doppler transceiver for transmitting signals into a surveillance zone; means for reception of Doppler signals returned from said surveillance zone; means to provide a spectrogram; means for Doppler signal conditioning; means for scene analysis from momentary spectrogram data; means to evaluate aggregated data; and means to provide statistical analysis. The means for reception of Doppler signals, the means to provide a spectrogram, the means for Doppler signal conditioning, the means for scene analysis, the means to evaluate aggregated data, and the means to provide statistical analysis are all operatively connected to a support-vector-machine that is loaded with a learning kernel trained with real-truths of a multitude of cases, followed by a hierarchical decision making, in order to provide an alert in the case of human target presence in the surveillance zone and to forego an alert in the event of other moving targets and interference phenomenon. The Doppler transceiver can be a radar transceiver, a sonar transceiver, a Lidar transceiver, a range-gated-radar transceiver, or the like.

In certain embodiments, the spectrogram output signal can be de-noised by nullification of unneeded noise-columns, and/or whitened by reduction of deterministic signals. A plurality of momentary characteristic values of scene-analysis can be calculated and recorded from the spectrogram. The characteristic values can include one or more of the following: tracking a torso velocity of the target, an upper −6 dB point of a torso velocity signal, a lower −6 dB point of a torso velocity signal, tracking a leg velocity of the target, a difference of frequency indices of upper and lower −6 dB points of a torso velocity signal, power generated from a torso signal, an average power generated from a leg signal, an average power per Short Time Fourier Transform, an average power of frequencies between upper and lower −6 dB points of a torso velocity, an average of frequency indices with power over 20 dB with reference to an average background noise, a frequency index at 85% of a cumulative sum of a signal amplitude per Short Time Fourier Transform, a −6 dB Q-factor of power generated from a torso signal. The characteristic values can be recorded over a three-second period of time.

According to certain embodiments, a plurality of aggregated values can be calculated from the characteristic values. The aggregated values can relate to at least one of the following average torso power, leg periodicity, torso periodicity, phasing between leg and torso periodicity, a ratio between a maximum frequency of leg velocity tracking and an average frequency of torso velocity tracking, a mean of a power spectrum profile, standard deviation of a power spectrum profile, an upper −6 dB point of torso velocity signal periodicity, a lower −6 dB point of torso velocity signal periodicity, phasing between torso periodicity and an upper −6 dB point of torso velocity signal periodicity, phasing between torso periodicity and a lower −6 dB point of torso velocity signal periodicity, phasing between an upper −6 dB point of torso velocity signal periodicity and a lower −6 dB point of torso velocity signal periodicity, a ratio between average torso energy and average leg energy, a standard deviation of a Fast Fourier Transform of torso velocity tracking, a standard deviation of a Fast Fourier Transform of leg velocity tracking.

A plurality of statistical values can be calculated from the characteristic values. The statistical values can relate to at least one of a mean, a standard deviation, a modal value, a minimum value, a maximum value, and a median value. The statistical values can be selected through at least one of correlations and mutual information, to optimize system selectivity and robustness to noise while minimizing computational cost. The aggregated values and statistical values can provide a decision about an origin of the target by means of a pre-educated support-vector machine. The support vector machine can include local kernel components to separate islands of different classes of events and global kernel components that extend over a whole domain of events, wherein an optimization of parameters of the support vector machine for optimal selectivity is performed by an accelerated random search. Data output from the support vector machine can be passed through hierarchical decision making.

In certain embodiments, the intrusion alarm system further includes a plurality of settings to adjust a selectivity function. The settings can be optimized for a security application, for a security risk of an installation at hand, for a detection priority need of an installation at hand, or the like. In certain embodiments, learning kernels are re-trained in order to alternate and blend the decision making, to provide an optimum detection solution for an application at hand, and to accommodate needs of security installers and users. A database holding real-truth events can be extended to continuously improve hierarchal decision making.

In certain embodiments, the intrusion alarm system can further include a recorder to capture and store events. The recorder can rank stored events and record additional events by overwriting lower-ranked events. Ranking of stored events can be based on momentary spectrogram data, aggregated spectrogram data, statistical spectrogram data, hierarchical decision values, a decision indicator, or the like. The recorded events can improve the knowledge base for kernel training. The means for Doppler signal conditioning can be configured so a sensor complexity is decimated at the sensor and increased further upstream in a security chain. The sensor can provide early detection of a possible event by calculation of a Doppler signal standard deviation. The Doppler signal can be digitized, and in such embodiments, the digitized Doppler signal content is compressed, which can be summed to enable forward error correction. The intrusion alarm system can further include a communication protocol. The communication protocol can be energy efficient and/or spectral efficient.

These and other features of the systems and methods of the subject disclosure will become more readily apparent to those skilled in the art from the following detailed description of the preferred embodiments taken in conjunction with the drawings and tables.

BRIEF DESCRIPTION OF THE DRAWINGS

So that those skilled in the art to which the subject disclosure appertains will readily understand how to make and use the devices of the subject disclosure without undue experimentation, preferred embodiments thereof will be described in detail herein below with reference to certain figures.

DETAILED DESCRIPTION OF PREFERRED EMBODIMENTS

Figure 1:
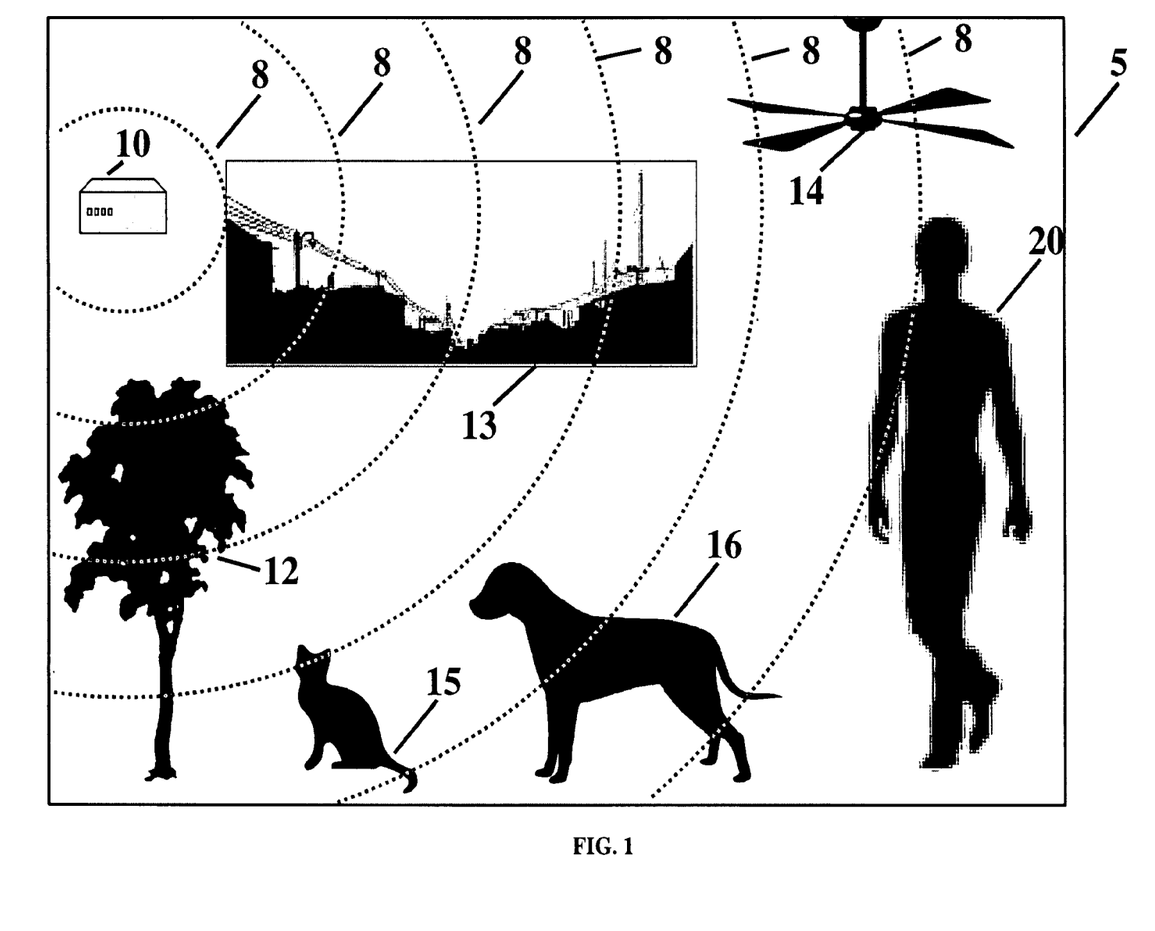
FIG. 1 is a schematic diagram depicting the preferred embodiment in its application showing a surveillance space with a human and other moving targets.

Reference will now be made to the drawings wherein like reference numerals identify similar structural features or aspects of the subject disclosure. For purposes of explanation and illustration, and not limitation, a schematic diagram of an exemplary embodiment of a system for selective intrusion detection in accordance with the disclosure is shown in FIG. 1 and is designated by reference character 10. Other embodiments of systems and methods for detecting intrusions in accordance with the disclosure, or aspects thereof, are provided in FIG. 2, as will be described.

Referring to FIG. 1, there is shown the preferred embodiment of the present disclosure for a selective intrusion detection system 10. The intrusion detection system 10 monitors a surveillance space 5. The surveillance space 5 shows moving target—e.g. a tree 12, a heavy street traffic area including EMI, RFI, ESD and the like 13, a ceiling fan 14, a cat 15, a dog 16, and a human 20. The intrusion detection system 10 receives Doppler return signals 8 indicative of moving targets 12, 13, 14, 15, 16, 20 present in and in the vicinity of the surveillance space 5, determines whether any signals are indicative of the presence of a human 20 or of another moving target 12, 13, 14, 15, 16, and provides an alert in the event a human 20 is indicated, and foregoes providing an alert in the event that other moving targets 12, 13, 14, 15, 16 are detected. The selectivity mode switch (ref. Table 3) influences the way the system behavior blends, to provide or forego an alarm in mixed events when a human 20 as well as other moving targets 12, 13, 14, 15, 16 are detected.

Figure 2:
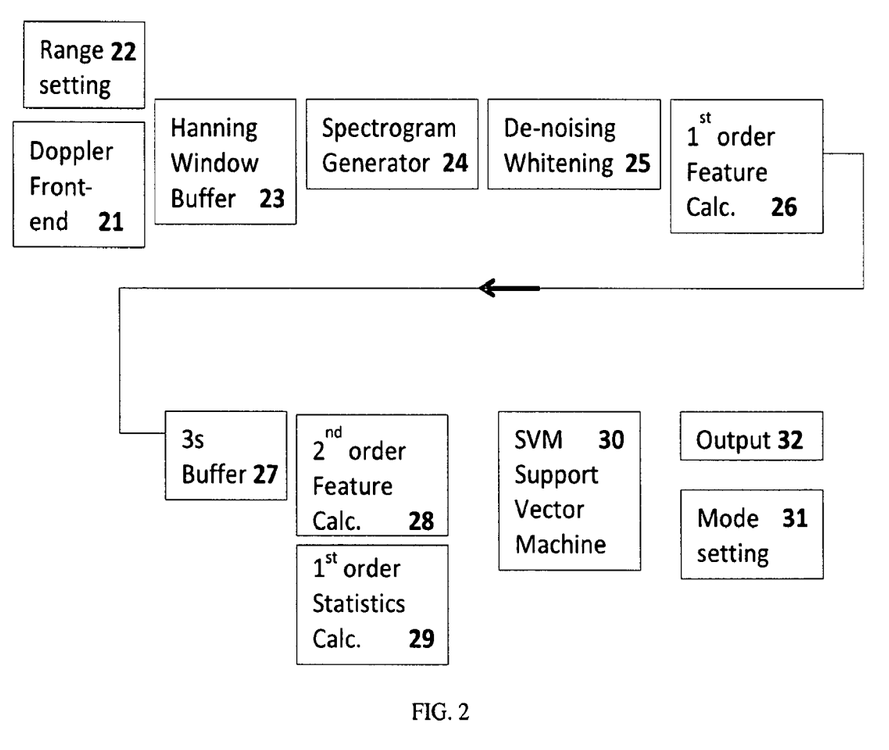
FIG. 2 is a schematic block diagram of an embodiment.

Referring to FIG. 2, an explanatory schematic block diagram of an embodiment of the selective intrusion detection system is depicted. A Doppler front-end 21 including a sensitivity range setting 22 is operative in the surveillance area and its Doppler return signal from the moving targets present in the surveillance area is processed. At first a buffer 23 is used in order to provide sufficient windowing samples, for example Hanning-windowing, for the spectrogram generator 24 to operate. After completion of the spectral analysis, unneeded noise-columns as well as unwanted deterministic intrinsic building signals, RFI, and the like are removed by de-noising and whitening algorithms 25. Subsequently First Order Time Features 26 are calculated according to Table 1. The outcome of these First Order Time Features 26 is stored in a 3-second buffer 27. From this 3-second buffer 27, Second Order Time Features 28 are calculated according to Table 2. Furthermore statistical values 29 determined from the First Order Time Features 26 are calculated from the content of the 3-second buffer 27. All results from Second Order Time Features 28 calculations as well as the results from the statistical calculations 29 are incident to the Support Vector Machine 30. Mode-setting 31 influences the SVM Support Vector Machine decision threshold, residing in the SVM kernel, in order to adapt to the needed security and financial risk, according to Table 3, to suit the security application at hand. Mode-setting 31 may even select different pre-calculated SVM Kernels, since these Kernels contain all parameters needed for wanted real-truth decision making. Alternatives for the SVM decision making algorithm are shown in Table 5. Furthermore the output module 32 will alarm as a conclusion of hierarchical decision making.

Figure 3:
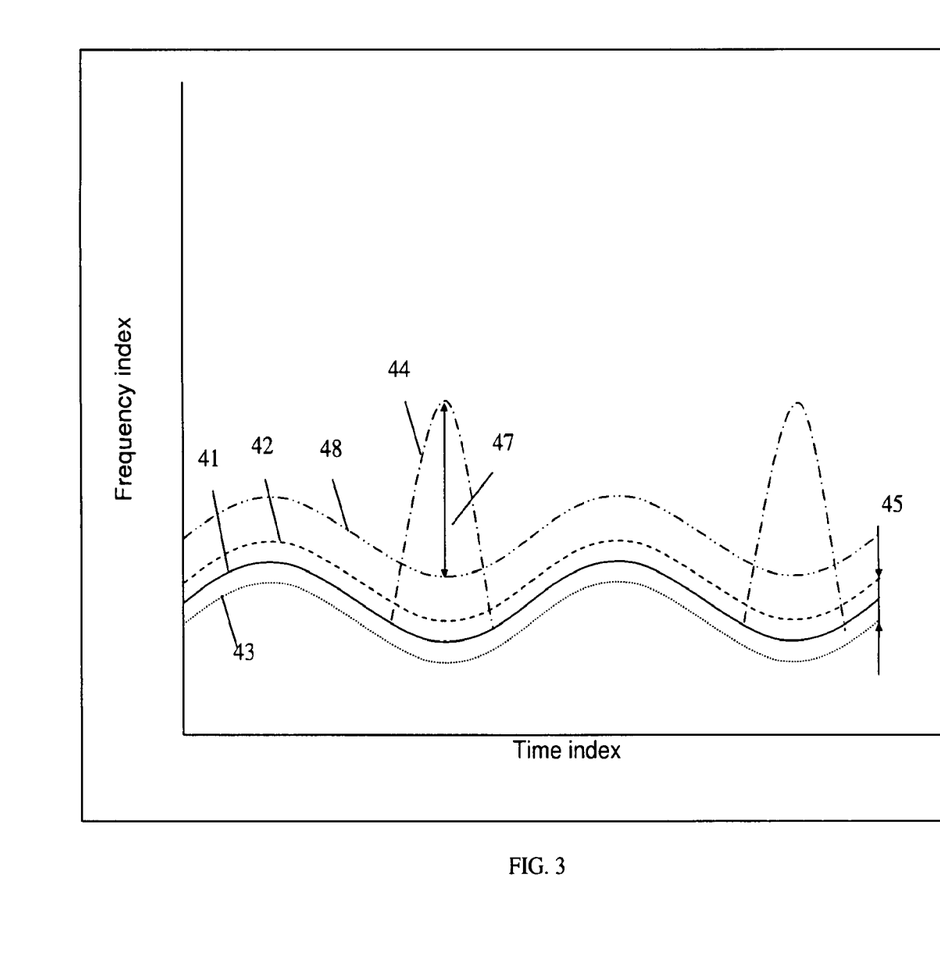
FIG. 3 is an explanatory graphical presentation of First Order Time Features.

Referring to FIG. 3, the horizontal rhythmic lines show the time-evolution of the corresponding First Order Time Features torso velocity tracking 41, upper −6 dB point of the torso velocity 42, lower −6 dB point of the torso velocity 43, and leg velocity tracking 44. These features are a result of the spectrogram of the human body dynamics and biometric characteristics during movement. For a list of First Order Time Features, reference is made to Table 1. As shown in FIG. 3, the momentary average power generated by the leg 47 is calculated by these features. First the delta 45 is calculated between the upper and lower −6 dB points of the torso velocity. Then a sum 48 is taken of the upper −6 dB point of the torso velocity 42 and the delta 45. Finally the average of the amplitudes over the range from the sum 48 up to and including the leg velocity tracking 44 is used to obtain the momentary average power generated by the leg 47.

From the teaching above it should be clear that time-feature analysis is designed to carry-out the human body dynamic analysis in order to track its rhythms and quirks, finding distinguishing factors of the nature (origin) of the target at hand. In electronics theory, Q-factor is conventionally calculated by using the −3 dB points; however, the −6 dB points were used for the set of predetermined factors to provide additional robustness to noise.

Figure 4:
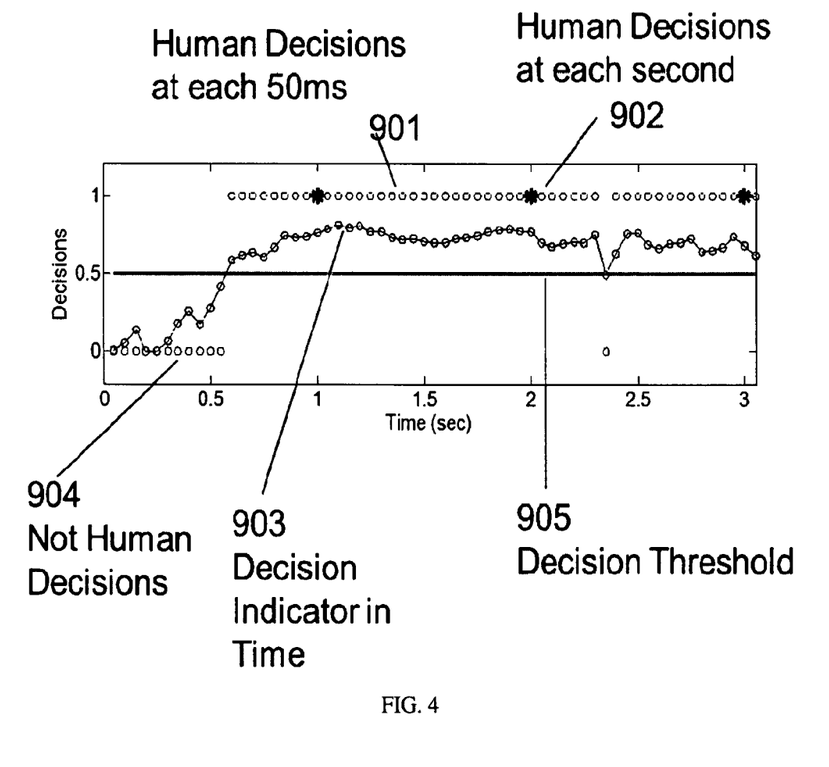
FIG. 4 is a hierarchical decision making graph with multiple time scales.

FIG. 4 illustrates the hierarchical decision making where human decisions are available every 50-ms 901 and are combined by hierarchical decision making rules into robust decisions at each second 902, based on the decision indicator in time 903, and the decision threshold 905. The one-second decisions 902 are further combined into 3-second decisions (not visible in FIG. 4); The nonhuman decisions 904 are the result of other moving targets such as IBS Intrinsic Building Signals, EMI, RFI, ESD or pets and the like. These nonhuman decisions are taken at a lower level in the decision hierarchy, while the 50-ms decisions 901 are taken at a higher level and the one-second decisions 902 at an even higher level when an alarm may be triggered.

The confidence level of the decision is low if the decision indicator 903 is close to the decision threshold 905, in the undecided interval [0.4, 0.6]. The confidence is high if the decision indicator 903 is close to 1 for human or 0 for non-human.

Selectivity Optimization

A rich database with relevant Doppler signals from all events, as mentioned throughout this publication, has been logged, as well as labeled, with real truth analysis by and from experts. During the synthesis of the SVM kernels, regression methods where used to train the behavior of decision making to match this real-truth data as reported by experts.

In order to boost robustness of the system behavior in adverse Doppler-input conditions, the selectivity of the embodiment has been further optimized by a plurality of methods as mentioned in Table 4. Many intruder attacks as well as quirky human and pet motions have been captured and trained in order to ascertain that the algorithms are living up to the expectations of the security installers and the "voice of their customers", the users.

Continuous Improvement of the System Behavior

In order to continue improving the intrusion detection system of the present disclosure, the system has been be configured for real time learning by capturing events, adding the events to a database, and adjusting the algorithm. Several events will be stored in memory for diagnostic purposes. A ranking system for the events is based on: a) First as well as Second Order Time Features; b) hierarchical decision values; and c) human/other moving target identifier. When this buffer space is fully used, events will only be stored by overwriting a previously stored event. Since this action is destructive for the previously stored event, a smart decision will be taken. The criterion a), b) and c), already mentioned, is used to rank the priority of the events. The least useful event will be replaced with the new event. When needed the event will be read from the buffer and added to the learning database after real truth ranking by an expert. For example, events associated to missed detections or to false alarms are added to the learning database. By adding the most useful events in the learning database, the algorithm learning process yields more accurate results as time progresses, and is as a result thereby the driving continuous improvement of the selective intrusion detection system.

Grid Computing

To better leverage available resources, the down-stream (sensor level) processing should be kept to a minimum. Thus only low complexity indicators are used to identify a quiescent state or a possible threat. In the case where more detailed analysis is needed for a selective intrusion detection, the data will not be processed locally. Rather, the data will be communicated up-stream (control panel level or central station level) for decision making by using an efficient protocol. In such case the tasks for the sensor to be executed are: (1) early detection of a possible event, e.g. by calculation of the Doppler signal standard deviation (RMS-value); (2) Doppler signal digitization; (3) source compression to reduce redundant data; (4) forward error correction to maximize good throughput; and (5) handling the communication protocol. These remaining tasks will decimate complexity of the decision making algorithms and enable up-stream processing. Implementation can be either wired or wireless, so long as the communication method remains efficient, in terms of energy consumption per bit communicated [nano-Joule/bit] and in terms of spectral efficiency [(bits/s)/Hz]. To maintain an efficient communication method, interference with the radar, sonar and lidar operation should be avoided so as not to influence its Doppler output.

TABLE 1

| Number | First Order Time Feature | Formula |
|---|---|---|
| 1 | Torso velocity tracking | Frequency index of maximum amplitude per single STFT |
| 2 | Upper −6 dB point of the Torso velocity | With reference to Torso velocity tracking, in upward direction we log the frequency index of the half amplitude point, the −6 dB point. |
| 3 | Lower −6 dB point of the Torso velocity | With reference to Torso velocity tracking, in downward direction we log the frequency index of the half amplitude point, the −6 dB point. |
| 4 | Leg velocity tracking | From the maximum frequency index downward we log the first frequency index with +13 dBn. In order to avoid local maxima we validate the continuity and de-bounce as needed. |
| 5 | Delta between upper and lower −6 dB points of the Torso velocity | Frequency index difference between First Order Time Feature 2 and First Order Time Feature 3 |
| 6 | Power generated by the Torso | The amplitude at the frequency index of First Order Time Feature 1 |
| 7 | Average power generated by the Leg | The average of the amplitudes over the range starting from frequency index (First Order Time Feature 2 + First Order Time Feature 5) up to the frequency index of First Order Time Feature 4 |

TABLE 1-continued

| Number | First Order Time Feature | Formula |
|---|---|---|
| 8 | Average power per Short Time Fourier Transform (STFT) | Average of all the amplitudes per single STFT |
| 9 | Average power of the frequencies between upper −6 dB and lower −6 dB points | The average of the amplitudes with frequency indices starting at First Order Time Feature 3 up to First Order Time Feature 2 |
| 10 | Average of the frequency indices with power over 20 dBn | Integration of the frequency indices witch contain amplitudes of over 20 dBn divided by the amount of indices found |
| 11 | 70% of the cumulative sum of the power per STFT | In upward direction: the first frequency index found where the cumulative sum of all the amplitudes of a single STFT exceeds 70% of the cumulative total |
| 12 | 85% of the cumulative sum of the power per STFT | In upward direction: the first frequency index found where the cumulative sum of all the amplitudes of a single STFT exceeds 85% of the cumulative total |
| 13 | 95% of the cumulative sum of the power per STFT | In upward direction: the first frequency index found where the cumulative sum of all the amplitudes of a single STFT exceeds 90% of the cumulative total |
| 14 | Q-factor | First Order Time Feature 1 divided by First Order Time Feature 5 |

* dBn = dB w.r.t. average Doppler background noise

TABLE 2

| Number | Second Order Time Feature | Formula |
|---|---|---|
| 1 | Average Torso/Body power | Average of First Order Time Feature 6 |
| 2 | Leg period | Find the leg index frequency peaks and calculate the leg period from the time intervals |
| 3 | Torso period | The frequency corresponding to the highest amplitude of the FFT from the cross-correlation of First Order Time Feature 1 and First Order Time Feature 11 |
| 4 | Phasing between Leg period and Torso period | The phase shift between Second Order Time Feature 2 and Second Order Time Feature 3 |
| 5 | Average Q-factor | Average of First Order Time Feature 14 |
| 6 | Standard deviation of the Q-factor | Standard deviation of First Order Time Feature 14 |
| 7 | Ratio between peak Leg velocity and average Torso velocity | The leg index frequency peak divided by the average of First Order Time Feature 1 |
| 8 | Mean of the power spectrum profile | Average of First Order Time Feature 10 divided by the cross-correlation of First Order Time Feature 1 and First Order Time Feature 11 |
| 9 | Standard deviation of the power spectrum profile | Standard deviation of First Order Time Feature 10 divided by the cross-correlation of First Order Time Feature 1 and First Order Time Feature 11 |
| 10 | Upper −6 dB point of the Torso/Body velocity period | The frequency corresponding to the maximum amplitude of the FFT from First Order Time Feature 2 |
| 11 | Lower −6 dB point of the Torso/Body velocity period | The frequency corresponding to the maximum amplitude of the FFT from First Order Time Feature 3 |
| 12 | Phasing between Torso period and upper −6 dB point of the Torso period | The phase shift between Second Order Time Feature 3 and Second Order Time Feature 10 |
| 13 | Phasing between Torso period and lower −6 dB point of the Torso period | The phase shift between Second Order Time Feature 3 and Second Order Time Feature 11 |
| 14 | Phasing between upper −6 dB point of the Torso period and lower −6 dB point of the Torso period | The phase shift between Second Order Time Feature 10 and Second Order Time Feature 11 |
| 15 | Ratio between the average Torso energy and the average leg energy | Average of First Order Time Feature 6 divided by the First Order Time Feature 7 |
| 16 | Standard deviation of the amplitude of the frequencies available in the Torso/Body signal | Standard deviation of the FFT from the cross-correlation of First Order Time Feature 1 and First Order Time Feature 11 |
| 17 | Standard deviation of the amplitude of the frequencies available in the Leg Doppler signal | Standard deviation of the FFT from the cross-correlation of First Order Time Feature 4 and First Order Time Feature 12 |
| 18 up to . . . | Statistical information of First Order Time Features | Examples are the mean, the standard deviation, its modal value, minimum, maximum, median etc. per First Order Time Feature |

TABLE 3

| Selectivity Mode | Hazards Other moving targets | Security Risk | Decision Making Priority |
|---|---|---|---|
| Residential Applications | IBS Pets | Medium risk | Suppression of other moving targets (other than humans) |
| General Purpose | IBS Pets | Medium risk | Maximum selectivity |
| Estates | IBS Single Pet | High property risk | Intruder detection |
| Commercial | IBS | High financial risk | Intruder detection |
| Outdoor Applications | Environment Rodents Vermin Pets | Medium risk | Suppression of environmental signals and other moving targets |

TABLE 4

Optimization methods used

| Method nr.: | Method type: |
|---|---|
| 1 | Bumptree |
| 2 | Genetic Algorithm |
| 3 | Accelerated Random Search |
| 4 | Hammer Algorithm |
| 5 | Pseudo Boolean |
| 6 | Pseudo Boolean Constraint Solver |
| 7 | Unconstraint Pseudo Boolean |
| 8 | Simulated Annealing |
| 9 | Tabu Search |

TABLE 5

Alternatives for the SVM decision making algorithm

| Method nr.: | Method type: |
|---|---|
| 1 | K Nearest Neighbour (KNN) |
| 2 | Gaussian mixture models |
| 3 | Regression |
| 4 | Ruled-based decision |
| 5 | Markov models |
| 6 | Bayesian inference |
| 7 | Probabilistic Latent Semantic Analysis (PLSA) |

What is claimed is:

1. An intrusion detection system comprising:
a radar transceiver configured and adapted to transmit and receive radar signals indicative of moving targets present in a surveillance space;
a processor operatively connected to the radar transceiver to convert radar signals into spectrograms and to determine whether any given spectrogram is indicative of presence of a human or of another moving target in the surveillance space;
an alarm operatively connected to the processor, wherein the processor and alarm are configured to provide an alert in the event the processor determines any given spectrogram is indicative of a human, and to forego providing an alert in the event the processor determines any given spectrogram is indicative only of another moving target; and
a smart diagnostic system operatively connected to the processor, the smart diagnostic system configured to:
store spectrograms and corresponding end user input of human/other moving target determinations to a database; and
to update determination processes of the processor based on the stored spectrograms and the corresponding end user input in the database to continuously update and improve determination processes and performance of the intrusion detection system.

2. An intrusion detection system as recited in claim 1, wherein the processor is configured and adapted to determine whether any given spectrogram is indicative of a human based on a set of predetermined factors.

3. An intrusion detection system as recited in claim 2, wherein the set of predetermined factors are obtained from an experimental data set by:
extracting coefficients from spectrograms of the experimental data set using at least one of a filter, a transform, a weighted average, and a Goertzel transform; and
computing the set of predetermined factors from the extracted coefficients by at least one of means function, max function, standard deviation, derivative, sorting, cumulative sum, moving average, correlation, and period estimation.

4. An intrusion detection system as recited in claim 2, wherein the processor is configured to determine whether the set of predefined factors are human are selected based on a latent semantic method.

5. An intrusion detection system as recited in claim 2, wherein the set of predetermined factors are extracted from a database of signals representative of movements of humans, pets, and other targets and are obtained by learning performed by at least one of optimizations, iterations, heuristics and recursive techniques; and wherein the processor is configured to determine whether the predefined factors are indicative of a human and to trigger the alarm based on at least one of: rules, regressions, support vector machine, probabilistic latent semantic method, k-nearest neighbor, probabilities, and indicator functions that are compared against a predetermined threshold value.

6. An intrusion detection system as recited in claim 2, wherein the set of predetermined factors includes first order time features including at least one of: torso velocity tracking, upper −6 dB of the torso velocity, lower −6 dB of the torso velocity, delta between upper and lower −6 dB of the torso velocity, power generated by torso, average power generated by leg, average power per short time Fourier transform, average power of the frequencies between upper and lower −6 dB points, average of frequency indices with power higher than 20 dB/Hz, 70%, 85% and 95% of a cumulative sum of power per short time Fourier transform, and Q-factor.

7. An intrusion detection system as recited in claim 2, wherein the set of predetermined factors includes second order time features including at least one of: average torso/body power, torso period, phasing between leg Doppler signal chirp period and torso Doppler signal period, average Q-factor, standard deviation of Q-factor, ratio between peak leg velocity and average torso velocity, mean of power spectrum profile, standard deviation of power spectrum profile, upper −6 dB point of torso/body velocity period, lower −6 dB point of torso/body velocity period, phasing between torso period and upper −6 dB point of torso period, phasing between torso period and lower −6 dB point of torso period, phasing between upper −6 dB point of torso period and lower −6 dB point of torso period, ratio between average torso energy and average leg energy, standard deviation of amplitude of frequencies available in torso and body signals, standard deviation of amplitude of frequencies available in leg Doppler chirp signal, average of delta frequency between upper and lower frequency points, standard deviation of delta frequency between upper and lower frequency points.

8. An intrusion detection system as recited in claim 2, wherein the set of predetermined factors are selected through correlations and mutual information to optimize system selectivity and robustness to noise to minimize computational cost.

9. An intrusion detection system as recited in claim 1, wherein the processor is configured and adapted to determine whether any given spectrogram is indicative of a human, based on a predetermined algorithm that calculates an indicator for presence of a human or another moving target.

10. An intrusion detection system as recited in claim 9, wherein the processor and alarm are configured to provide an alert if the indicator has a value that exceeds a predetermined threshold value.

11. An intrusion detection system as recited in claim 1, wherein the processor is configured and adapted to convert radar signals into spectrograms using a set of modules including at least one of: windowing, overlapping, short-time Fourier transform, clipping, binning, noise elimination, logarithmic conversion, amplitude correction, time grouping, whitening by means of horizontal and vertical bar-removal, spectrum generator block diagram, Cepstrum analysis, wavelet analysis, vertical smoothing, and horizontal smoothing.

12. An intrusion detection system as recited in claim 1, wherein the processor includes a support vector machine, wherein the support vector machine includes: local kernel components and global kernel components that extend over a whole domain of events; and wherein parameters of a kernel are optimized for human selectivity and low false alarms using a database of representative signals of humans, pets, and other moving targets.

13. An intrusion detection system as recited in claim 12, wherein the local kernel components include Gaussians to separate islands of different classes of events.

14. An intrusion detection system as recited in claim 12, wherein the global kernel components include linear functions, multivariate polynomials, or step type functions such that the global components provide a generalization over the whole domain of events.

15. An intrusion detection system as recited in claim 12, wherein the optimization of the parameters is performed by at least one of an accelerated random search and a global optimization procedure.

16. An intrusion detection system as recited in claim 1, wherein the determination of the processor is optimized by at least one of: the decision thresholds, data processing parameters, time feature parameters, and time feature weights; wherein optimization includes at least one of: accelerated random search optimization, evolutionary optimization, gradient based optimization, simulated annealing, genetic optimization, pattern searches, optimization using response surfaces, optimization using surrogates, interval methods, and hierarchical methods; and wherein optimization is decomposed into sub-problems that are optimized sequentially.

17. An intrusion detection system as recited in claim 1, further comprising a selectivity mode adjustor for matching sensitivity for a given application and a given level of risk.

18. An intrusion detection system as recited in claim 1, further comprising a range control operatively connected to the radar transceiver to adjust the surveillance space coverage volume.

19. An intrusion detection system as recited in claim 1, further comprising communication means operatively connected to the processor to send spectrograms to an up-stream server to enable detailed selectivity processing further up-stream and to alleviate complexity and current consumption constraints down-stream.

20. An intrusion detection system as recited in claim 1, wherein the processor includes a noise elimination system including at least one of: energy measures, background filtering approaches, and measures of randomness.

21. An intrusion detection system as recited in claim 1, wherein the processor includes a trigger detection system including at least one of: energy measures and heuristics.

22. An intrusion detection system as recited in claim 1, wherein the end user input is used to make a human or other moving target determination to be used as ground truth to update or train the intrusion detection system.

23. An intrusion alarm system for detecting the presence of a moving target in the presence of interfering phenomena, comprising:
 a Doppler transceiver for transmitting signals into a surveillance zone;
 means for reception of Doppler signals returned from said surveillance zone;
 means for providing a spectrogram; and
 a processor configured to determine respective origins of Doppler targets for providing reliable intrusion security and forgoing privacy issues; and
 a smart diagnostic system operatively connected to the processor, the smart diagnostic system configured to:
  store spectrograms and corresponding end user input of human/other moving target determinations to a database; and
  to update determination processes of the processor based on the stored spectrograms and the corresponding end user input in the database to continuously update and improve determination processes and performance of the intrusion alarm system.

* * * * *